Dec. 7, 1937.   M. KLEIN ET AL   2,101,028
DIFFERENTIAL GAUGE
Filed June 12, 1935
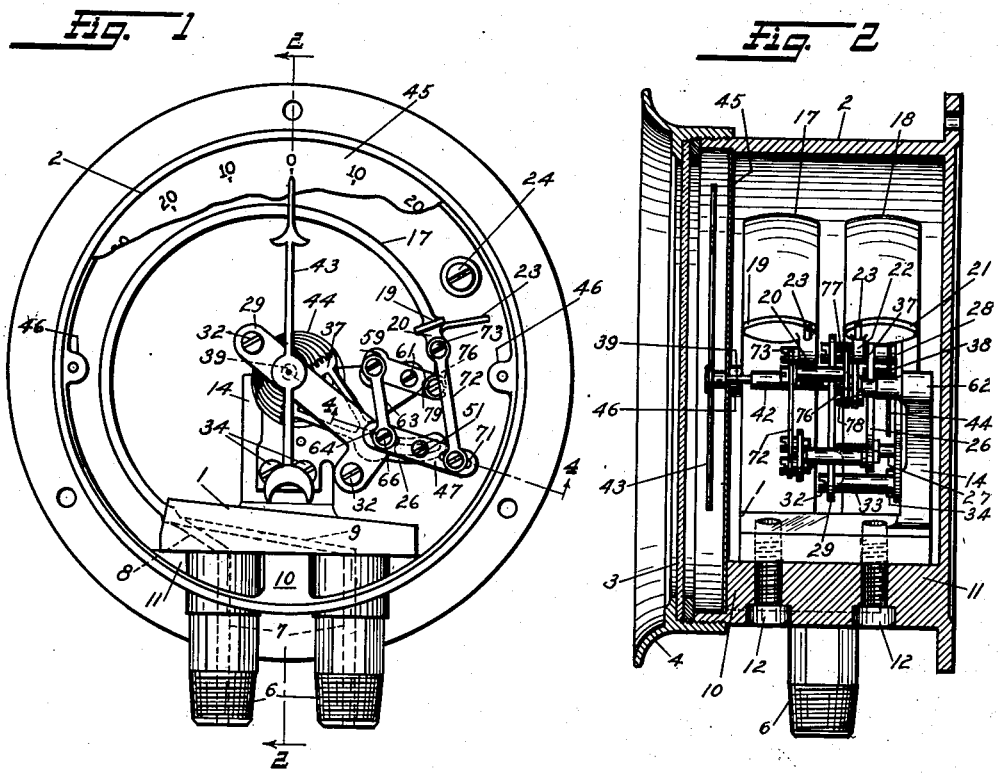
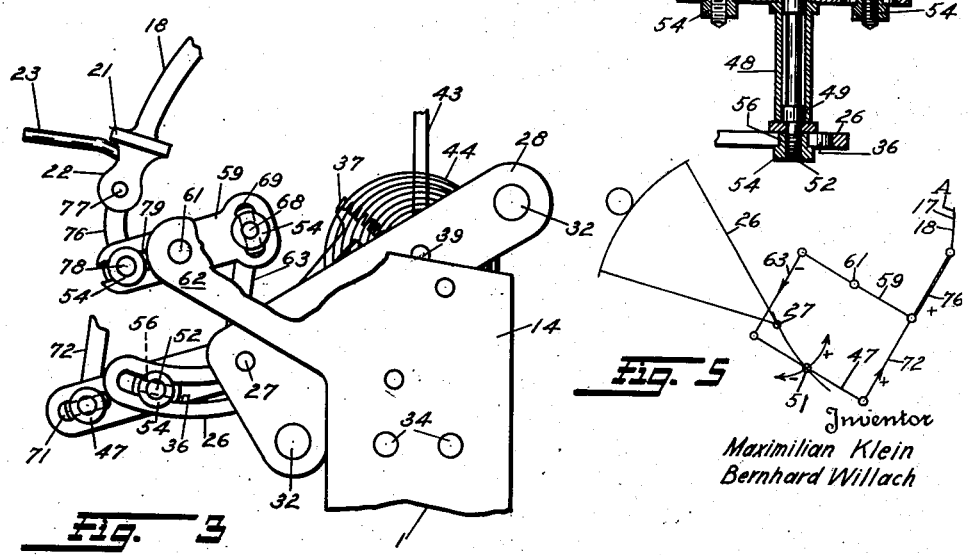
Inventor
Maximilian Klein
Bernhard Willach
By Strauch & Hoffman
Attorneys Patented Dec. 7, 1937

2,101,028

UNITED STATES PATENT OFFICE 2,101,028

DIFFERENTIAL GAUGE

Maximilian Klein and Bernhard Willach, Sellersville, Pa., assignors to United States Gauge Company, Sellersville, Pa., a corporation of Pennsylvania Application June 12, 1935, Serial No. 26,277

5 Claims. (Cl. 73—109)

This invention relates to differential gauges for indicating or measuring differences in pressures or degrees of vacuum at two different points and is concerned more particularly with improvements in differential gauges wherein two fluid pressure points or sources are separately in communication with independently movable pressure-responsive devices. While the term "fluid" is employed in describing the operation of the improved differential gauge of the present invention, it is to be understood that this term includes liquids, gases or liquids and gases. The term "pressure" is employed herein to include pressures down to absolute vacuum.

The improved differential gauge of this invention is of a type wherein an indicator, such as a pointer, is actuated upon relative movement between pressure-responsive means such as Bourdon tubes or like devices which change in shape upon being subjected to fluid pressure.

It is a primary object of this invention to provide a device of the above character, which is extremely sensitive and accurate in its indication of pressure differences and which comprises relatively few movable parts, the latter being easily adjustable and maintaining their adjustment in operation.

Another object of the present invention is to provide an improved differential gauge wherein the pressure-responsive devices and the indicator and indicator operating mechanism are secured upon a common support to be housed within a protecting casing.

Another object of the present invention is to provide a novel operating mechanism for transmitting forces from the pressure-responsive devices to a pointer or the like. In this connection, it is a further object to provide for adjustment of the pointer operating mechanism so that the instrument may be conveniently kept in a condition of accurate adjustment.

In differential pressure gauges of the type wherein the pressure-responsive devices are free to respond independently to applied pressures, relatively complicated inter-connections in the form of specially shaped links and levers have been used to operate the indicator of the gauge and the disposition of these levers has made it necessary to depart from principles of design of demonstrated merit in the form and mounting of the parts and the design and structure of the casing which encloses and protects the mechanism. Also, in differential gauges of the prior art in which the pressure-responsive devices are independently movable, a special form of operating device is necessary to connect the operating mechanism to the pointer shaft in place of the usual "movement" as it is called, which term includes the pointer staff and the member for operating the pointer staff. The pointer operating mechanism of the present invention makes possible the use of any simple and efficient movement desired including the usual pinion and pivoted sector type, the latter being used with great success in pressure gauges generally. Heretofore it has been necessary in differential pressure gauges of the type with which the present invention is concerned to resort to movements of special construction involving sliding connections or to an arrangement in which the entire movement is pivotally mounted for bodily movement.

Accordingly, a further and major object of the present invention is to provide a novel mechanism for inter-connecting the pressure responsive devices of a differential gauge which shall be capable of use with any type of indicator-operating movement. More specifically, the major object of the present invention is to provide a novel system of leverage by which two members may move in parallel paths and show the differences in the amount of their movements without either of the members opposing the movement of the other. This result is necessary in the case of Bourdon tubes because of the spring qualities of the metal which, when one tube is opposed to the other, causes the tube under the lesser fluid pressure to add a further resistance or drag, caused by metallic spring resistance, to the motion of the other spring.

A still further object of the present invention is to provide a mechanism for imparting movement to the indicator of a differential gauge including a pair of levers one of which has a fixed fulcrum and the other a movable fulcrum, and links inter-connecting the free ends of the levers.

A still further object of the present invention is to provide an indicator-operating mechanism for a differential gauge comprising a pair of devices having portions movable in response to pressure and a pair of levers, one end of each of the levers being inter-connected to the movable portion of each of the devices, and in which one of the levers is pivoted to fixed fulcrum and the other to a movable fulcrum which alters its position by an amount proportional to the difference in pressures acting on the said devices.

A still further object of the present invention is to provide a differential pressure gauge wherein the pressure-responsive devices are capable of individual action in a novel manner in response to the pressure imposed on each device so that there is no tendency toward unnatural and/or permanent distortion of the devices which would destroy their accuracy.

A still further object of the present invention is to provide a differential pressure gauge wherein the pressure-responsive devices are connected to the indicator in a novel manner so that the pressure acting on either pressure-responsive device may be read individually when the pressure applied to the other is zero. In this connection it is also another object to provide in a novel manner for securing an indication of the pressure-responsive device experiencing the greater pressure as well as the difference in pressures.

Further objects of our invention will appear in the following description and the appended claims, when viewed in the light of the accompanying drawing, wherein:

Figure 1 is a front elevational view of a differential gauge embodying the present invention, the dial plate being removed to expose the working parts of the gauge.

Figure 2 is a view in side elevation, with the dial and cover plate in position, and the casing shown in vertical section on line 2—2 of Figure 1.

Figure 3 is a fragmentary view on an enlarged scale and taken from the rear of the linkage Figure 1.

Figure 4 is a fragmentary sectional view on an enlarged scale, the section being taken on line 4—4 of Figure 1.

Figure 5 is a diagrammatic showing in simplified form of the novel linkage comprising an important feature of the present invention.

With further reference to the drawing, wherein like reference characters are employed to designate like parts, a substantially rectangular bracket or socket 1 serves as a support for the operating parts of the gauge. The bracket and the parts secured thereto are disposed within a casing 2 having a suitable removable transparent face 3 attached to the casing 2 in any suitable manner, as by the ring 4. The bracket 1 has secured to it a pair of threaded tubular extensions 6, the internal bores 7 of which may be put in communication with separate sources of fluid pressure.

As shown by Figures 1 and 2, the socket 1 which may be integral with the tubular extensions 6 is flat in form and includes passages 8 and 9 each of which is in communication with one of the bores 7. The casing 2 is provided with a projection 10 extending from the front of the casing to the rear thereof where it intersects a segment like shelf 11. The top of the projection 10 and the shelf 11 provide a T-shaped rest for the bracket 1 which is secured thereon by screws 12 inserted in spaced holes in the projection 10. An upstanding arm 14 is provided on the base 1 for a purpose to be described. In assembling the socket 1 to the casing 2, the extensions 6 lie on each side of the projection 10 and extend outwardly through apertures in the peripheral wall of the casing 2.

Pressure responsive devices in the form of Bourdon tubes 17 and 18 are secured rigidly in one end of the bracket 1, the bore of each tube being in communication with the bore 7 of one of the tubular extensions 6 by way of one of the passages 8 or 9. The tubes 17 and 18 are preferably designed to have substantially the same characteristics so that in responding to applied pressure, they will be distorted by equal amounts for equal pressure changes. The end of the Bourdon tube 17 opposite its point of attachment to the bracket 1 is closed by a cap 19 which is provided with an apertured lug 20. Likewise, the free end of the tube 18 is closed by a cap 21 having an apertured lug 22. The apertured lugs 20 and 22 provide means for pivotally connecting the free ends of the Bourdon tubes to the gauge operating mechanism to be described. Stop pins 23 are secured to the caps 19 and 21 for cooperation with a stationary stop 24 secured to the wall of the casing. The stop 24 is a screw headed pin threaded into the back of the case 2 and projecting forwardly into the path of elements 23 to serve as stops to prevent damage from excessive pressure.

An arm 26 carries a pivot 27 that is journalled in plates 28 and 29 that are secured together as by screws 32 which project through spacing sleeves 33. The assembled plates are secured to the bracket 1 by other screws 34. The arm 26 is provided adjacent one end with a slot 36 and a portion thereof at the end opposite the slot 36 is formed to provide a sector gear 37 that meshes with a pinion 38 rigidly secured on a shaft 39 journalled at one end in the plate 28 and extending through a bearing tube 42 secured to the plate 29. An indicating hand or pointer 43 is mounted on the shaft 39, and a hair spring 44 is provided, one end of which is attached to the shaft and the other end of which may be conveniently secured to one of the spacing sleeves 33. The pointer 43 cooperates with a suitably graduated dial 45 secured against a ledge of the casing 2 by screws threaded into the lugs 46. The mechanism just described including the shaft 39 and the arm 26 is generally referred to as the movement and the parts thereof are of the usual construction.

The gauge operating mechanism which interconnects the free ends of the tubes 17 and 18 with the arm 26 of the indicator hand movement will now be described. As shown in detail by Figure 4 of the drawing, a perforated lever 47 is secured to a spacing sleeve 48 with the bore of the sleeve concentric with the perforation in the lever. The lever 47 is pivotally connected to the arm 26 by means of the sleeve 48 which is journalled on the bearing portions 49 of a specially formed screw 51, the reduced threaded end 52 of which is received in an annular threaded member or clamping nut 54. The nut 54 is rectangular in cross section for a portion of its length as indicated by the reference character 56 providing flat parallel sides which are spaced apart a distance slightly less than the width of the slot 36 and prevent turning of the nut when the end 52 of the screw 51 is threaded therein to clamp the lever 26 between the shoulder provided by the flat end of the bearing portion 49 opposite the head of the screw and the annular part of the nut 54. A washer is preferably interposed between the end of the bearing 49 and the side of the lever 26. By the clamping means described, the pivotal axis of the lever 47 may be adjusted to any desired point along the slot 36.

A second lever 59 is pivotally secured on a stationary post 61, the latter being mounted on extension 62 of the bracket 1. A link 63 is pivotally and adjustably connected at each of its ends to the free ends of the levers 47 and 59. The lever 47 has a slot 64 to provide for the adjustable connection of the link 63 thereto which is accomplished by a nut 54 like that which is engaged in the slot 36 and a screw 66 having a reduced threaded end which is threaded into the nut. The aperture at the end of the link 63 pivots on an annular enlarged portion of the screw 66 adjacent its head. Likewise, the opposite end of the link 63 pivots on an enlarged annular portion of a screw 68 which is threaded into a nut 54, the rectangularly-shaped portion of which extends into a slot 69. It will be noted that slot 64 is parallel to the length of lever 47 and slot 69 is at right angles to the length of lever 59. This arrangement of the slots makes possible a wide range of adjustment of inter-connection of the ends of the levers 47 and 59.

The end of lever 47 opposite the slot 64 is slotted as indicated by the reference character 71 to provide an adjustable pivotal connection for a link 72 which is pivotally connected to the apertured lug 20 on the tube 17. The adjustable connection of the link 72 with the slot 71 is accomplished by a nut 54 and a screw having a reduced threaded end in a manner similar to that described above in connection with the slot 64 and the link 63. A screw 73 having a reduced threaded end engaged in the threaded aperture of the lug 20 serves to connect the link 72 to the tube 17. The end of the tube 18 is pivotally connected to a link 76 as by a screw 77 engaged in the threaded aperture of the lug 22. The opposite end of the link 76 is adjustably secured by a screw 78 and nut 54 to the slotted end 79 of the lever 59.

The operating mechanism just described is designed for use where the pressures acting on the pressure-responsive devices are equal or where the pressure imposed on one pressure-responsive device may be above or below the pressure in the other device. The indicator 43 is initially set so as to be centered with respect to the face of the gauge as shown in Figure 1 when zero or equal pressures exist in both pressure-responsive devices simultaneously and the dial or scale plate 45 is provided with suitable graduations near its edge with the center graduation marked "0" and the graduations at either side of the zero being suitably marked to indicated differences of pressure. The indicator will swing to one side or the other of its central position depending upon which of the tubes 17 or 18 carries the greater pressure. It may be found desirable to indicate pressure differentials where the pressure in one pressure-responsive device is always equal to or greater than the pressure in the other in which event the illustrated instrument may be changed slightly by substituting a scale whereon the zero point is at the right and the indicator is initially set at the zero point and moves therefrom in only one direction over a single set of graduations.

The linkage illustrated in detail by Figures 1 to 4 of the drawing is shown diagrammatically in simplified form by Figure 5. In this latter figure, the path of movement of the point 51 with respect to the ends of the Bourdon tubes 17 and 18 is modified. The two Bourdon tubes 17 and 18 are represented by the single line A. It will be understood that tube 17 lies above tube 18 as shown in the more detailed figures of the drawing and that their center lines follow the same curve when equal pressure is applied to both. The links and levers are given the same reference characters as in the remaining figures of the drawing. Lever 59 is pivoted on the stationary fulcrum 61. Lever 47 is pivoted on the movable fulcrum 51 which is located on the segment lever 26, the lever 26 being pivoted on the stationary fulcrum 27.

Upon inspection of Figure 5 it will be seen that the difference of the motions of the two tubes 17 and 18 will cause the pivot point 51 to move. It will be assumed that movements of the links 72 and 76 in the same direction are positive movements and that movement of the link 63 is a negative movement. The positive movements of the links 72 and 76 are modified by a negative movement of the link 63 causing a final positive or negative movement of the point 51 depending on whether link 72 or 76 moves the greater distance.

The operation of the illustrated embodiment will now be described by assuming that several pressure conditions are imposed on the gauge. With the parts occupying the position illustrated in Figure 1 of the drawing, a uniform increase in pressure in both tubes 17 and 18 will result in substantially uniform movement of the free ends of the tubes. Links 72 and 76 will swing the levers 47 and 59 in a counter-clockwise direction about their pivots as viewed on Figure 1 and the pivot point 51 of the lever 47 will not be displaced from its illustrated position. The indicator 43 will remain on the zero point of the scale thus correctly indicating zero differential pressure.

Assuming that the pressure existing in the tube, for example, tube 17 rises above that in tube 18, link 72 will rotate the lever 47 about its point of pivotal connection with the end of link 63. The point 51 of lever 47 will be displaced upwardly, swinging the arm 26 counter-clockwise about its pivot point 27 which will cause the indicator 43 to move in a clockwise direction over the scale. The amount of displacement of the pivot point 51 will be proportional to the difference in pressure in tubes 17 and 18 and therefore the position of the pointer on the scale will indicate the amount by which the pressure in tube 17 exceeds that in tube 18.

If the pressure in tube 18 rises above that in tube 17, lever 59 will be turned counter-clockwise about its stationary pivot 61 by the link 76 by an amount which is greater than the movement imparted to the lever 47 by the link 72 assuming that the pressure on both tubes 17 and 18 is above normal. The link 63 will swing the lever 47 counter-clockwise about its point of pivotal connection with the link 72 and the movable pivot point 51 of the lever 47 will thus be displaced to swing the arm 26 in a clockwise direction. The indicator 43 will move in a counter-clockwise direction over the scale to indicate the amount by which the pressure in the tube 18 exceeds that in the tube 17.

It will be seen from the foregoing description of the operation of the gauge that the position of the indicator on the scale shows not only the amount of pressure difference but shows also the direction or sense of the differential pressure.

The slotted connections 71 and 79 provide for adjustment of the effective lengths of the levers 47 and 59 about their pivots 51 and 61. The slot 69 may be used to vary the effective length of the link 63 and the slot 64 to vary the effective length of the lever 47 about its point of pivotal connection to the arm 26 and also about its pivotal connection to the arm 72. The adjustment provided by the slot 36 in the arm 26 assists in calibrating the gauge.

The differential gauge of our invention possesses many advantages not to be found in the prior art and among the advantages specifically pointed out above are the novel structure of the support for the indicator and indicator-operating mechanism of the instrument which allows all the operating parts to be assembled as a unit to the casing; the novel mechanism interconnecting the pressure-responsive devices to the indicator which makes possible the use, if desired, of a conventional indicator movement; the freedom of response of each of the pressure-responsive devices to pressures acting individually thereon thereby preventing harmful and possibly permanent distortion of these devices and the novel adjustment features of the gauge which facilitate ready adjustment so that accuracy may be restored in the event of damage arising from abuse.

It will be seen from the foregoing that a compact, accurate and readily adjustable instrument is provided by our invention and that the parts thereof are free from unnecessary complication.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination in a gauge a cylindrical casing, an axially directed ridge formed in the bottom of said casing, a transverse ridge formed at the rear of said casing and connected with said first named ridge, the top faces of said ridges forming a continuous supporting surface, a bracket resting on said supporting surface, a pair of sockets depending integrally from said bracket one on each side of and in close proximity to said axial ridge and to the front of said transverse ridge, a pair of Bourdon tubes mounted on said bracket, said bracket and sockets being provided with a pair of passages adapted to individually establish communication between separate fluid pressure sources and the interior of said Bourdon tubes, indicating means carried solely by said bracket and operatively connected to said tubes.

2. In combination, a casing provided with a supporting portion, a bracket supported solely on said supporting portion including a projecting arm and a post on said arm, a pair of passageways in said bracket, pressure responsive elements mounted on said bracket in individual communication with said passageways, an indicator and indicator operating mechanism comprising a rotatable shaft and means to rotate said shaft, a lever pivoted on said post and a second lever pivoted on said operating means in parallelism to said first named lever, a link connecting adjacent ends of said levers, links connecting said pressure responsive elements to said levers as the ends remote from said first named link, spaced plates secured in parallel position on said bracket and carrying said indicator and indicator operating means and means for securing said bracket to said casing.

3. In a differential gauge, a casing, an indicator and means for operating said indicator including two pressure responsive tubes operatively connected thereto, a pin element carried by the movable end of each tube and a single pin element carried by said casing and projected into the path of movement of said first named pin elements whereby movement of tubes is limited.

4. In combination in a gauge, a case, a projection in the interior of said case extending longitudinally thereof to form a support, a flat bracket provided with an upstanding portion, said bracket resting on said support, a plurality of similar pressure responsive tubes carried by said bracket, a pair of parallel conduits on said bracket spaced apart to lie on each side of said support and in communication with said tubes, an indicator and indicator operating mechanism carried by said upstanding portion and operatively connected to said tubes, spaced apertures in the wall of said case to receive said conduits, and means extending into said support from the exterior of said case for securing said bracket on said support.

5. In a differential gauge, a support, a bracket mounted on said support, an indicator and indicator operating means carried by said bracket, two pressure responsive devices carried by said bracket and linkage mechanism operatively connecting said devices to said operating means, said linkage mechanism including a bodily movable lever mounted on an adjustable pivot on said operating means, a lever pivotally mounted on said bracket and parallel to said first named lever, a link connecting adjacent ends of said levers, said link being adjustable transversely of one lever and longitudinally of the other, a link connecting one of said devices to the free end of one of said levers and a link connecting the other of said devices to the free end of the other lever, said last named links being adjustable longitudinally of said levers.

MAXIMILIAN KLEIN.
BERNHARD WILLACH.